(12) United States Patent
Hiasa

(10) Patent No.: US 11,195,257 B2
(45) Date of Patent: Dec. 7, 2021

(54) IMAGE PROCESSING METHOD, IMAGE PROCESSING APPARATUS, IMAGING APPARATUS, LENS APPARATUS, STORAGE MEDIUM, AND IMAGE PROCESSING SYSTEM

(71) Applicant: CANON KABUSHIKI KAISHA, Tokyo (JP)

(72) Inventor: Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 16/535,386

(22) Filed: Aug. 8, 2019

(65) Prior Publication Data

US 2020/0065942 A1 Feb. 27, 2020

(30) Foreign Application Priority Data

Aug. 24, 2018 (JP) .............................. JP2018-156813
Jul. 3, 2019 (JP) .............................. JP2019-124790

(51) Int. Cl.
*G06T 5/00* (2006.01)
*G06T 5/50* (2006.01)
(Continued)

(52) U.S. Cl.
CPC ................ *G06T 5/002* (2013.01); *G06T 5/50* (2013.01); *G06T 7/55* (2017.01); *H04N 5/2621* (2013.01); *G06T 2207/20084* (2013.01)

(58) Field of Classification Search
CPC .......... G06T 5/002; G06T 5/50; G06T 5/003; G06T 5/20; G06T 7/55; G06T 7/50;
(Continued)

(56) References Cited

U.S. PATENT DOCUMENTS 8,890,942 B2 * 11/2014 Ogasahara ........... H04N 5/2258
348/51
8,947,523 B2 * 2/2015 Matsui ...................... H04N 5/77
348/135
(Continued)

FOREIGN PATENT DOCUMENTS

CN 103826033 A 5/2014
CN 107431755 A 12/2017
(Continued)

OTHER PUBLICATIONS

Extended European Search Report issued in European Appln. No. 19192533.8 dated Nov. 20, 2019.
(Continued)

*Primary Examiner* — Michael S Osinski
(74) *Attorney, Agent, or Firm* — Rossi, Kimms & McDowell LLP

(57) ABSTRACT

An image processing method includes the steps of acquiring a first image obtained by imaging an object space through a first pupil in an optical system, and a second image obtained by imaging the object space through a second pupil different from the first pupil in the optical system, and generating a blur reshaped image in which a blur caused by a defocus is reshaped based on the first image and the second image using a neural network.

23 Claims, 12 Drawing Sheets

(51) Int. Cl.
  *H04N 5/262* (2006.01)
  *G06T 7/55* (2017.01)
(58) Field of Classification Search
  CPC ......... G06T 2207/20084; G06T 2207/20081;
       G06T 2207/10028; G06T 2207/20201;
       H04N 5/2621; H04N 5/2253; H04N
       5/2254; H04N 5/23212; H04N 5/23229;
       H04N 5/23209; H04N 5/232122; H04N
       5/232123; H04N 5/36961; G06N 3/0454;
       G06N 3/0481; G06N 3/08; G06N 3/084;
       G06N 3/04; G06N 3/0445; G06N 3/0472;
       G06K 9/6256; G06K 9/00248; G06K
       9/00268; G06K 9/6257; G06K 9/6262
  See application file for complete search history.

(56) References Cited

U.S. PATENT DOCUMENTS

| | | | |
|---|---|---|---|
| 9,185,272 B2 | 11/2015 | Ebe | |
| 9,313,419 B2* | 4/2016 | Tanaka | H04N 5/2621 |
| 10,019,810 B2* | 7/2018 | Arnison | G06T 7/571 |
| 10,025,162 B2* | 7/2018 | Watanabe | H04N 9/04557 |
| 10,574,916 B2 | 2/2020 | Fukuda | |
| 10,664,953 B1* | 5/2020 | Lanman | G02B 27/017 |
| 10,674,074 B2 | 6/2020 | Fukuda | |
| 2008/0232707 A1* | 9/2008 | Lee | G06T 5/10 |
| | | | 382/255 |
| 2012/0300104 A1* | 11/2012 | Onuki | H04N 5/232122 |
| | | | 348/302 |
| 2012/0300112 A1* | 11/2012 | Natsume | G03B 17/00 |
| | | | 348/336 |
| 2013/0058588 A1* | 3/2013 | Wang | G06T 5/003 |
| | | | 382/255 |
| 2013/0308866 A1* | 11/2013 | Lin | G06K 9/46 |
| | | | 382/195 |
| 2016/0171340 A1* | 6/2016 | Fleishman | G06K 9/00355 |
| | | | 382/159 |
| 2016/0337576 A1* | 11/2016 | Nobayashi | H04N 9/045 |
| 2017/0127048 A1* | 5/2017 | Nobayashi | H04N 13/128 |
| 2018/0061020 A1* | 3/2018 | Hiasa | G06T 3/60 |
| 2018/0121767 A1* | 5/2018 | Wang | G06K 9/6256 |
| 2019/0347771 A1* | 11/2019 | Suszek | G06T 7/50 |
| 2020/0022783 A1* | 1/2020 | Cramer | G06T 11/001 |
| 2020/0111198 A1* | 4/2020 | Hiasa | G06T 3/4023 |
| 2020/0242788 A1* | 7/2020 | Jacobs | G06T 7/593 |
| 2020/0260014 A1* | 8/2020 | Miyatani | G06N 3/08 |
| 2020/0327309 A1* | 10/2020 | Cheng | G06N 3/0445 |
| 2020/0388014 A1* | 12/2020 | Hiasa | G06N 20/00 |
| 2020/0394464 A1* | 12/2020 | Mishima | G06K 9/00214 |
| 2021/0073953 A1* | 3/2021 | Lee | G06T 5/002 |
| 2021/0166350 A1* | 6/2021 | Wang | G06T 5/003 |
| 2021/0233210 A1* | 7/2021 | Elron | G06T 5/50 |

FOREIGN PATENT DOCUMENTS

| | | |
|---|---|---|
| CN | 107465866 A | 12/2017 |
| JP | 2016220016 A | 12/2016 |

OTHER PUBLICATIONS

Wadhwa "Synthetic Depth-of-Field with a Single-Camera Mobile Phone" ACM Transactions on Graphics. Aug. 2018. vol. 37, Issue 4, pp. 1-18. Cited in NPL 1.

Office Action issued in Chinese Appln. No. 201910768726.2 dated Apr. 2, 2021. English translation provided.

* cited by examiner

IMAGE PROCESSING METHOD, IMAGE PROCESSING APPARATUS, IMAGING APPARATUS, LENS APPARATUS, STORAGE MEDIUM, AND IMAGE PROCESSING SYSTEM

BACKGROUND OF THE INVENTION

Field of the Invention

The present invention relates to an image processing method that reshapes a defocus blur in an image captured by dividing a pupil in an optical system, and obtains an image with a good defocus blur (bokeh).

Description of the Related Art

Japanese Patent Laid-Open No. ("JP") 2016-220016 discloses a method of controlling a shape of a blur caused by a defocus (defocus blur) by dividing a pupil in an optical system into a plurality of parts, by capturing a plurality of disparity images obtained by observing an object space from each divided pupil, and by adjusting weights when combining the plurality of disparity images.

However, the method disclosed in JP 2016-220016 cannot reproduce the defocus blur corresponding to a pupil larger than the pupil in the optical system, since this method adjusts the weight of each divided pupil and combines a plurality of disparity images. In other words, this method cannot compensate for the partially lost defocus blur caused by the vignetting. The uneven weights used for the combination of a plurality of disparity images may cause noises to increase. Since the annular pattern of the defocus blur caused by a two-line blur or an aspheric lens included in the optical system has a nano structure, the pupil in the optical system needs to be subdivided in order to reduce its influence. In this case, the spatial resolution may decrease or the noise may increase in each disparity image.

SUMMARY OF THE INVENTION

The present invention provides an image processing method, an image processing apparatus, an imaging apparatus, a lens apparatus, a program, and a storage medium, each of which can reshape a blur caused by a defocus of an image and obtain an image with a good defocus blur.

An image processing method according to one aspect of the present invention includes the steps of acquiring a first image obtained by imaging an object space through a first pupil in an optical system, and a second image obtained by imaging the object space through a second pupil different from the first pupil in the optical system, and generating a blur reshaped image in which a blur caused by a defocus is reshaped based on the first image and the second image using a multilayered neural network.

An image processing apparatus according to another aspect of the present invention includes an acquirer configured to acquire a first image obtained by imaging an object space through a first pupil in an optical system, and a second image obtained by imaging the object space through a second pupil different from the first pupil in the optical system, and a generator configured to generate a blur reshaped image in which a blur caused by a defocus is reshaped based on the first image and the second image using a neural network. An imaging apparatus including the above image processing apparatus also constitutes another aspect of the present invention. A lens apparatus attachable to and detachable from the above imaging apparatus also constitutes another aspect of the present invention. A non-transitory computer-readable storage medium storing a program that causes a computer to execute the above image processing method also constitute another aspect of the present invention.

An image processing system according to another aspect of the present invention includes a first processing unit and a second processing unit. The first processing apparatus includes a transmitter configured to transmit a request to the second processing apparatus for image processing using a first image obtained by imaging an object space through a first pupil in the optical system, and a second image obtained by imaging the object space through a second pupil different from the first pupil in the optical system. The second processing apparatus includes a receiver configured to receive the request sent from the first processing apparatus, an acquirer configured to acquire the first image and the second image, and a generator configured to generate a blur reshaped image in which a blur caused by a defocus is reshaped based on the first image and the second image using a neural network.

Further features of the present invention will become apparent from the following description of exemplary embodiments with reference to the attached drawings.

DESCRIPTION OF THE EMBODIMENTS

Figure 1:
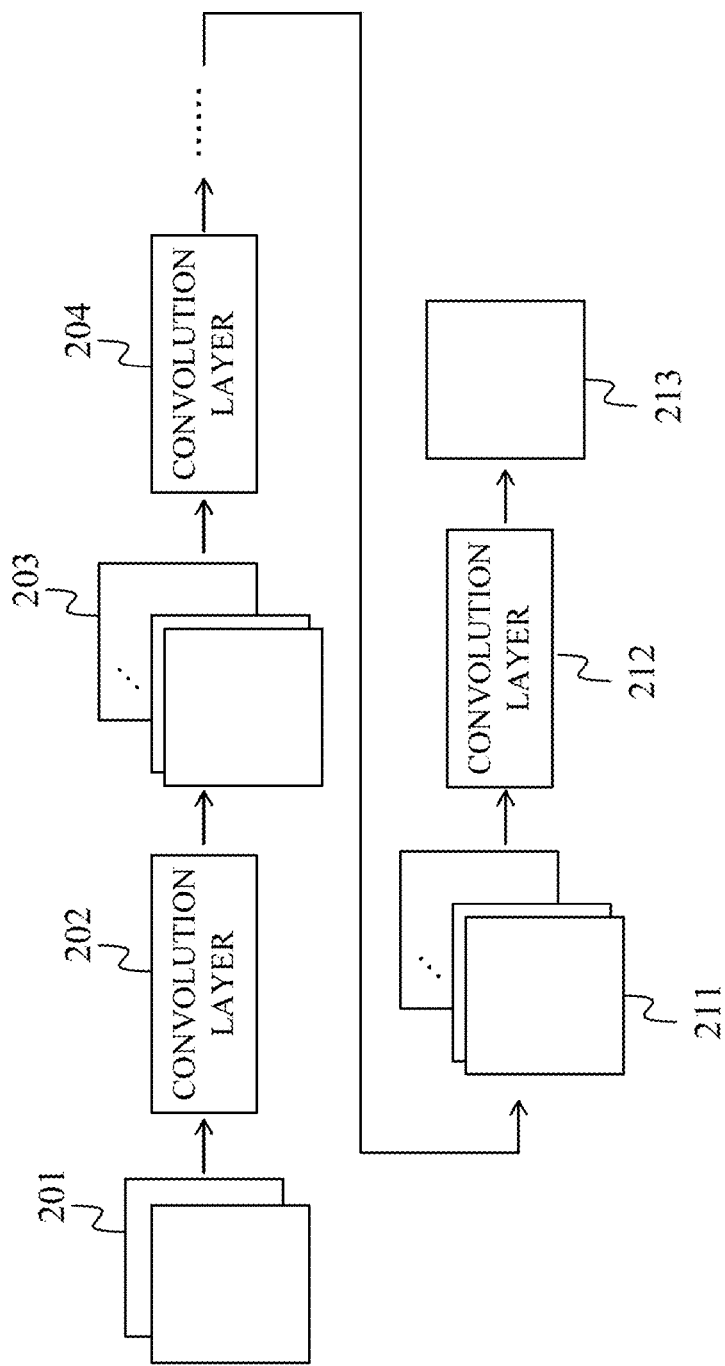
FIG. 1 illustrates a network structure that generates a blur reshaped image according to a first embodiment.

Referring now to the accompanying drawings, a description will be given of embodiments according to the present invention. Corresponding elements in respective figures will be designated by the same reference numerals, and a duplicate description thereof will be omitted.

Initially, before each embodiment is specifically described, the gist of the present invention will be described. The present invention uses deep learning to reshape a defocus blur in an image and to obtain an image with a good defocus blur. Reshaping the defocus blur is to restrain a partially lost defocus blur caused by the vignetting, a multiple blur (such as a doublet blur) caused by a peak separation of the defocus blur, an annular pattern of a defocus blur caused by a mode cutting mark on an aspheric lens, etc.

Figure 16:
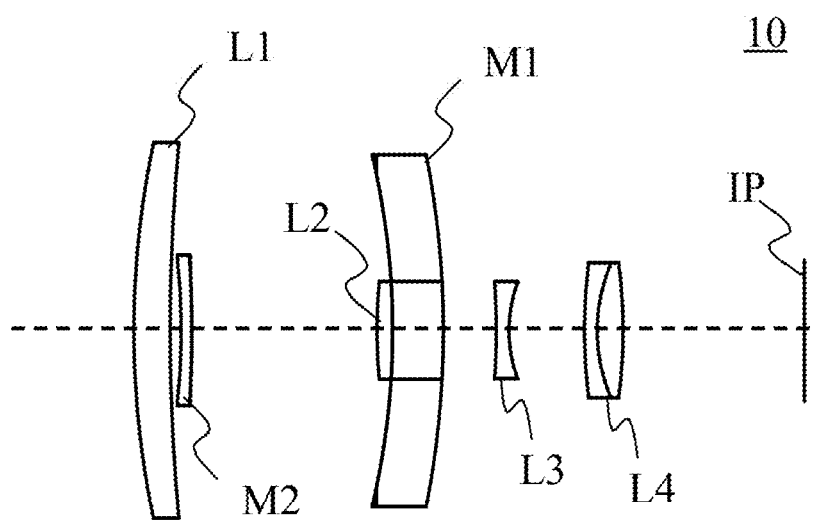
FIG. 16 is an explanatory view of an optical system provided with a mirror lens according to each embodiment.

Reshaping of the defocus blur also includes suppressing a phenomenon in which the defocus blur of the mirror lens is annular. FIG. 16 is a structural view of an optical system 10 provided with a mirror lens. As illustrated in FIG. 16, the optical system 10 includes a mirror lens configured to include a primary mirror M1 and a secondary mirror M2. The annular defocus blur is caused by the secondary mirror M2 shielding the pupil of the mirror lens (optical system 10). In FIG. 16, L1 to L4 denote lenses where L4 denotes a cemented lens. IP denotes an image plane, which corresponds to the position where the image sensor is disposed. Reshaping provides a good defocus blur of the defocus blur by changing the defocus blur to a reshape desired for the user (such as a flat circle and a Gaussian distribution function).

For highly accurate defocus blur reshaping, the present invention inputs a first image captured by a pupil (first pupil) of the optical system and a second image captured by part of the pupil (second pupil different from the first pupil) into deep learning. Since the first image and the second image have different pupil sizes, the defocus blurs have different sizes at a distance shifted from the in-focus distance. Thus, the defocus blur in the image can be distinguished from the object structure more effectively than a case where only one of the first image and the second image is input. Thereby, the defocus blur shaping by the deep learning can be realized with high accuracy.

First Embodiment

Figure 2:
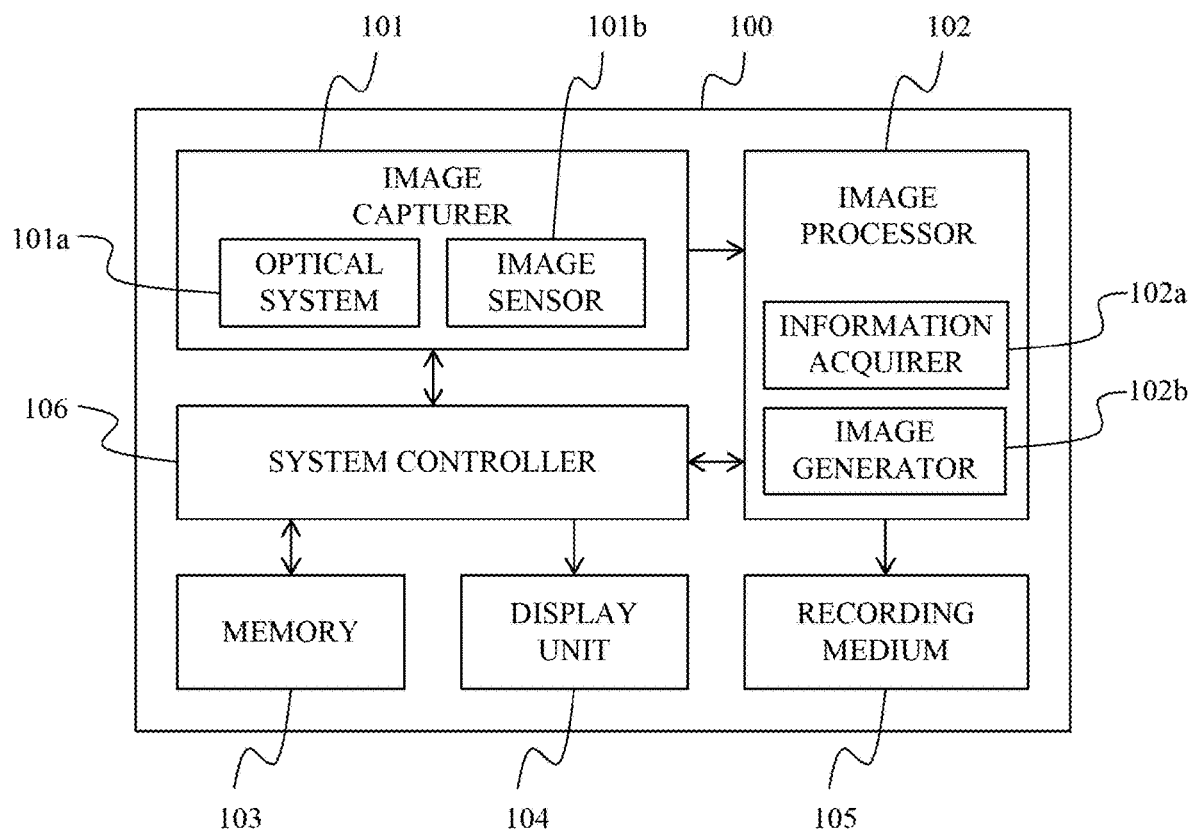
FIG. 2 is a block diagram of an imaging apparatus according to the first embodiment.
Figure 3:
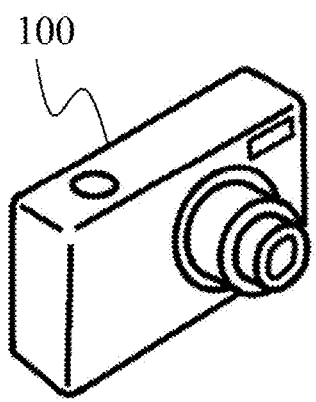
FIG. 3 is an overview of the imaging apparatus according to the first embodiment.

Referring now to FIGS. 2 and 3, a description will be given of an imaging apparatus according to a first embodiment of the present invention. FIG. 2 is a block diagram of an imaging apparatus 100. FIG. 3 is an overview of the imaging apparatus 100. While the imaging apparatus 100 according to this embodiment includes a camera body and a lens apparatus integrated with the camera main body, the present invention is not limited to this embodiment. The present invention is applicable to an imaging system including a camera body (imaging apparatus body) and a lens apparatus (interchangeable lens) attachable to and detachable from the camera body. A description will now be given of an outline of each component in the imaging apparatus 100, and a detailed description thereof will be given later.

As illustrated in FIG. 2, the imaging apparatus 100 includes an image capturer 101 that acquires an image (captured image) of an object space. The image capturer 101 includes an optical system (imaging optical system) 101a configured to condense incident light from an object space, and an image sensor 101b having a plurality of pixels. The image sensor 101b is, for example, a charge coupled device (CCD) sensor or a complementary metal-oxide semiconductor (CMOS) sensor.

Figure 4A:
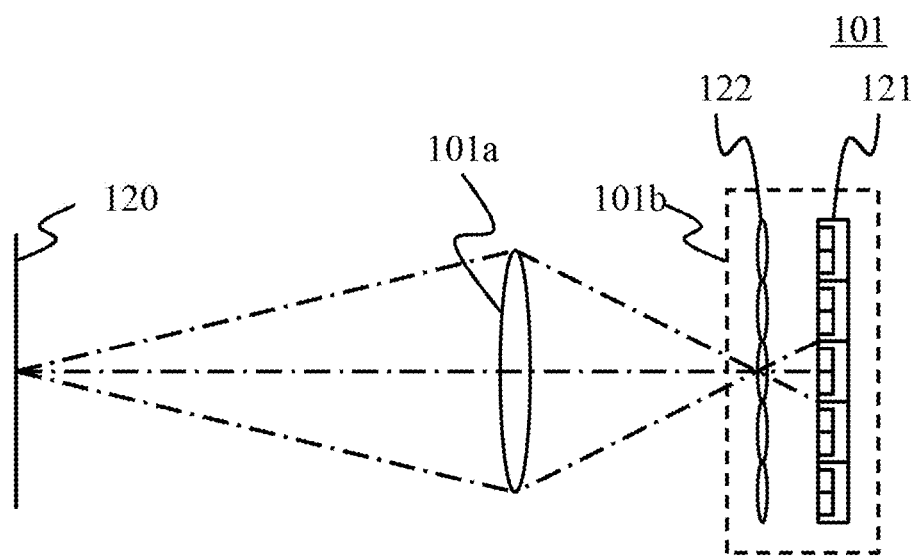
FIGS. 4A and 4B are explanatory views of an image capturer according to the first embodiment.
Figure 4B:
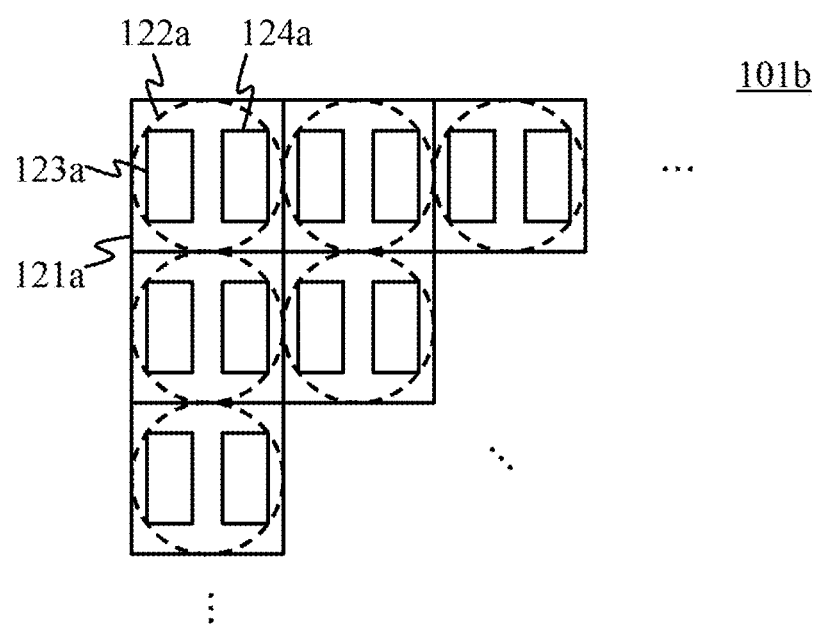

FIGS. 4A and 4B are explanatory views of the image capturer 101. FIG. 4A is a sectional view of the image capturer 101, and an alternate long and short dash line represents an axial light flux. FIG. 4B is a top view of the image sensor 101b. The image sensor 101b includes a micro lens array 122 and a plurality of pixels 121. The micro lens array 122 is disposed at a position conjugate with an object plane 120 via the optical system 101a. As illustrated in FIG. 4B, the micro lens 122 (only the micro lens 122a are described and the micro lens 122b and others are omitted) constituting the micro lens array 122 corresponds to a plurality of pixels 121 (only the pixel 121a is shown and the pixel 121b and others are omitted). When a plurality of components are collectively designated, only the reference numeral will be given, and when one of them is designated, the reference numeral will be affixed with a symbol such as "a."

Each of the plurality of pixels 121 includes a first photoelectric converter 123 and a second photoelectric converter 124 each of which photoelectrically converts an optical image formed through the optical system 101a. Thereby, for example, light incident on the pixel 121a is separated and received by a first photoelectric converter 123a and a second photoelectric converter 124a depending on the incidence angle (where the first photoelectric converter 123a and the second photoelectric converter 124a receive light incident at different incidence angles). The incidence angle of the light is determined by the position on the pupil in the optical system 101a which the light has passed. Thus, the pupil in the optical system 101a is divided into two partial pupils by two photoelectric converters, and the two photoelectric converters in one pixel obtain information by observing the object space from different viewpoints (pupil positions). In this embodiment, the division direction of the pupil is, but not limited to, a horizontal direction, and the division direction may be another direction such as a vertical direction or an oblique direction.

The image sensor 101b outputs a signal (second image, image A) obtained by the first photoelectric converter 123 and a signal (first image, A+B image) as an addition signal of the signal (image A) and a signal (third image, B image) acquired by the second photoelectric converter 124. Hence, this embodiment obtains the first image and the second image by simultaneously imaging the object space through the optical system 101a. This embodiment captures the first image and the second image by the same image sensor 101b.

The A image and the A+B image are temporarily stored in the memory 103. The image processing unit (image processing apparatus) 102 includes an information acquirer (acquirer) 102a and an image generator (generator) 102b, and executes the image processing method according to this embodiment (blur reshaping processing for reshaping a defocus blur). At this time, the information acquirer 102a acquires the A image and the A+B image from the memory 103, and the image generator 102b generates a blur reshaped image in which the defocus blur is reshaped based on the A image and the A+B image. The blur reshaped image according to this embodiment reduces the influence of at least one of vignetting, a multiple blur caused by a peak separation in a point spread function, an annular pattern, and shielding of a pupil in the optical system for the defocus blur. A detailed description of this processing will be given later.

The generated blur reshaped image is stored in a recording medium 105. When the user issues an instruction to display a captured image, the stored blur reshaped image is read out and displayed on a display unit 104. The image A and the image A+B already stored in the recording medium 105 may be read out, and the image processor 102 may generate the blur reshaped image. The above series of control is performed by a system controller 106.

Figure 5:
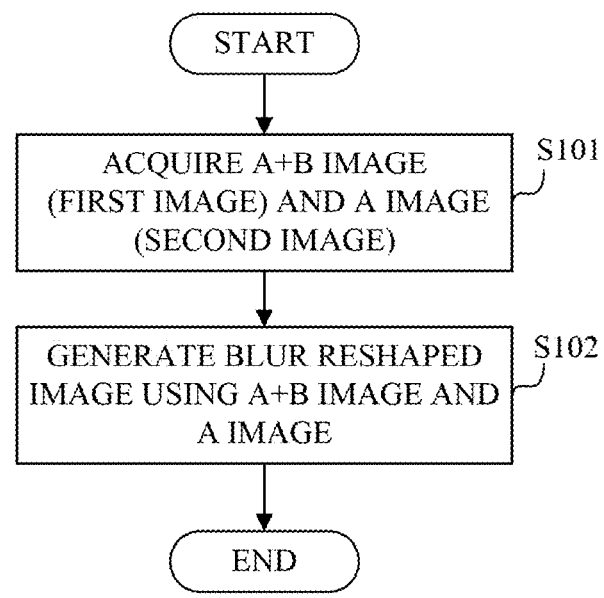
FIG. 5 is a flowchart showing generation processing of a blur reshaped image according to the first embodiment.

Referring now to FIG. 5, a description will be given of blur reshaping processing (generation of the blur reshaped image) configured to reshape the defocus blur performed by the image processor 102. FIG. 5 is a flowchart showing generation processing of the blur reshaped image. Each step in FIG. 5 is executed by the image processor 102 based on an instruction from the system controller 106.

First, in the step S101, the image processor 102 (information acquirer 102*a*) acquires an A+B image (first image) 201 and an A image (second image) 202 temporarily stored in the memory 103. The A image 202 is obtained by imaging the object space based on a light flux passing through a partial pupil (second pupil) as part of the pupil of the optical system 101*a*. The A+B image 201 is obtained by imaging the object space based on the light flux passing through the pupil (first pupil) of the optical system 101*a*. This embodiment includes the second pupil in the first pupil as part of the first pupil. Since the A+B image and the A image have different defocus blurs and the second pupil is smaller than the first pupil, the defocus blur of the A image is smaller than that of the A+B image. Using both the A+B image and the A image, this embodiment can distinguish the defocus blur in the image from the object structure. In other words, if there is no high frequency information in the image or there is a blurred area, whether this area is defocused and therefore blurred, or the in-focus object has no high frequency information. Further, the image capturer 101 configured as illustrated in FIGS. 4A and 4B can simultaneously capture the A+B image and A image of pupil sizes different from each other, and avoid a shift between images due to the movement of the object.

The A+B image contains a partially lost defocus blur caused by the vignetting of the optical system 101*a*, a multiple blur caused by the peak separation of the defocus blur, and an annular pattern of the defocus blur caused by the aspheric lens included in the optical system 101*a*. Next follows a description of them with reference to FIGS. 6 and 7A-7D.

Figure 6:
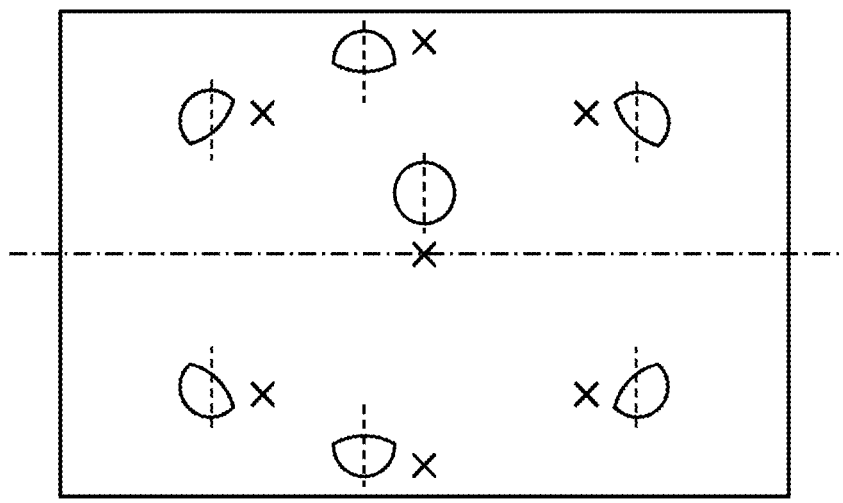
FIG. 6 is an explanatory diagram of a pupil division at each image height and azimuth according to the first embodiment.

FIG. 6 is an explanatory view of the pupil division at each image height and azimuth. FIG. 6 illustrates the A+B image, in which the divided pupil at the image height and the azimuth of the cross are drawn next to the cross. Since the defocus blur has substantially the same shape as that of the pupil except the reversal, the defocus blur has a shape as a partially lost circle at an off-axis image height where vignetting occurs. A broken line in FIG. 6 is a pupil dividing line (dividing straight line), and the second pupil corresponding to the A image is a partial pupil on the right side of the broken line. Thus, the defocus blur of the A image also has a shape of the partially lost circle.

Figure 7A:
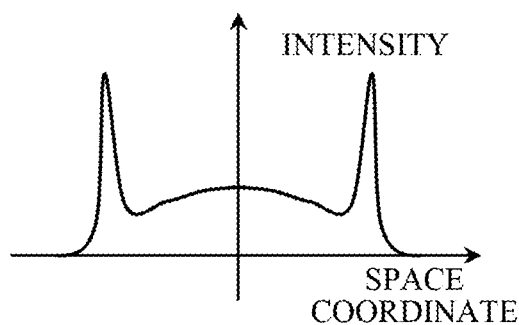
FIGS. 7A to 7D illustrate point spread functions before and after a blur is reshaped at a defocus distance according to each embodiment.

Referring now to FIG. 7A, a description will be given of the multiple blur. FIG. 7A illustrates a point spread function (PSF) before the blur is reshaped at a defocus distance. In FIG. 7A, the abscissa axis represents the space coordinate (position), and the ordinate axis represents the intensity. This is similarly applied to FIGS. 7B to 7D as described later. As illustrated in FIG. 7A, a doublet blur as an illustrative multiple blur has a PSF having separated peaks. When the PSF at the defocus distance has a shape illustrated in FIG. 7A, an object that is originally a single line appears to be doubly blurred when defocused. Similarly, if the PSF peak is separated into three at the center and at both ends, it appears triple blurred. The influence on defocus blur caused by the peak separation of the PSF will be called a multiple blur.

Figure 7B:
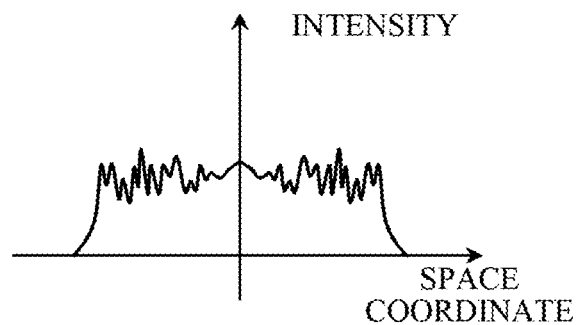

Referring now to FIG. 7B, the annular pattern will be described. FIG. 7B illustrates the PSF before the blur is reshaped at the defocus distance. As illustrated in FIG. 7B, the annular pattern is realized when the PSF has a vibration component. This vibration component is mainly caused by uneven cutting of a mold used to manufacture the aspheric lens included in the optical system 101*a*. These undesirable shapes of the defocus blur can be reshaped by the blur reshaping processing described below.

Next, in the step S102, the image generator 102*b* generates a blur reshaped image in which the defocus blur is reshaped using a multilayered neural network. In this embodiment, the multilayered neural network preferably contains more than two layers. The A+B image (first image) and the A image (second image) are input into the multilayered neural network. The blur reshaped image is obtained by changing the blur shape in the defocus area relative to the image (A+B image) captured with the entire pupil in the optical system 101*a*. At this time, the in-focus object does not change in the blur reshaped image and the A+B image. This embodiment uses the convolutional neural network (CNN) for the multilayered neural network. However, the present invention is not limited to this embodiment, and may use other methods, such as the GAN (General Creative Network).

Referring now to FIG. 1, a detailed description will be given of the processing of generating the blur reshaped image 213 by the CNN. FIG. 1 illustrates a network structure for generating a blur reshaped image. The CNN has a plurality of convolution layers. In this embodiment, the input image 201 is an image in which the A+B image (first image) and the A image (second image) are connected (concatenated) in the channel direction. When each of the first image and the second image has a plurality of color channels, the image has a number of channels twice as many as the number of channels in them. The input image 201 is calculated in the first convolution layer 202 as the sum of convolution and bias with a plurality of filters. Herein, a filter coefficient will be called a weight (weight information). The filter and bias values in each layer are determined in the prior learning to reshape the unwanted defocus blur into a good shape, which will be described in more detail below.

A first feature map 203 summarizes the results calculated for each filter. The first feature map 203 is input into the second convolution layer 204, and the sum of convolution and bias with a plurality of new filters is similarly calculated. The blur reshaped image 213 is a result obtained by repeating this procedure and by inputting an (N−1)-th feature map 211 into an N-th convolution layer 212. Herein, N is a natural number of 3 or more. In general, the CNN having three or more convolution layers corresponds to the deep learning. In each convolution layer, the nonlinear transform using an activation function is performed in addition to the convolution. The illustrative activation function includes a sigmoid function, a ReLU (Rectified Linear Unit), etc. This embodiment uses ReLU represented by the following expression (1).

$$f(x)=\max(x,0) \qquad (1)$$

In the expression (1), x represents a feature map, and max represents a MAX function that outputs the maximum value among the arguments. However, the nonlinear transform may not be performed in the last N-th convolution layer.

This embodiment preprocesses each of the A+B image and the A image, and inputs the preprocessed A+B image and A image into the CNN. The preprocessing includes the division of the A+B image and the A image and the reverse control of the divided image or filter (reverse processing). In other words, the image generator 102*b* divides each of the A+B image and the A image by a straight line that is parallel to the axis that makes the second pupil line-symmetric with respect to the object point on the optical axis, and passes the reference points (on or near the optical axis) of the A+B image and the A image. The image generator 102*b* performs preprocessing (reversal processing) for reversely controlling the divided A+B image and A image or weight information. The capacity of the weight information can be reduced by generating the blur reshaped image based on the A+B image and the A image after the reverse processing (or the weight information after the reverse processing). This will be described with reference to FIG. 6.

As illustrated in FIG. 6, in this embodiment, when one of the upper and lower sides of the A+B image (or the A image) is reversed with respect to an alternate long and short dash line as an axis, it overlaps the other pupil division and the line symmetry relationship is shown. Hence, the defocus blur is also line symmetrical with respect to the alternate long and short dash line. Thus, once the weight information for correcting the blur is stored for one of the upper and lower areas of the alternate long and short dash line, the other can be obtained by reversing the image or the weight information the blur reshaped image can be estimated.

The reverse processing includes reversing a reference order in calculating a product of an image and weight information. By learning the weight information only for one of the upper and lower areas, the width of the defocus blur to be reshaped by the CNN is limited, and highly accurate blur shaping can be realized with a smaller network. This embodiment divides each of the A+B image and the A image into two in the vertical direction, and uses the upper half or the lower half of the A+B image and the A image for the input image 201. An entirely blur reshaped image can be obtained by individually processing the upper and lower divided images with the CNN and by combining the output blur reshaped images.

Since this embodiment divides the pupil in the horizontal direction, the symmetry axis is a horizontal line. Assume that the pupil is divided in the vertical direction. Then, the symmetry axis also becomes a vertical line. This will be generalized as follows: The line-symmetry axis for the entire image in the divided pupil relationship is parallel to an axis that passes the optical axis and makes the second pupil line-symmetrical on the optical axis. Only if the weight information is stored for one of the divided areas for the A+B image and the A image divided along this axis, the other may be obtained by the reverse control with the same weight information and used for the defocus blur reshaping processing.

The generated blur reshaped image has a defocus spread wider than that of the A+B image. When the partially lost defocus blur caused by the vignetting is reshaped, the spread of the defocus blur is wider than that of the A+B image. When the multiple blur or the annular pattern is reshaped, the spread of the defocus blur is as wide as that of the A+B image. This embodiment can reshape the defocus blur of an image and generate an image having a good defocus blur.

Figure 8:
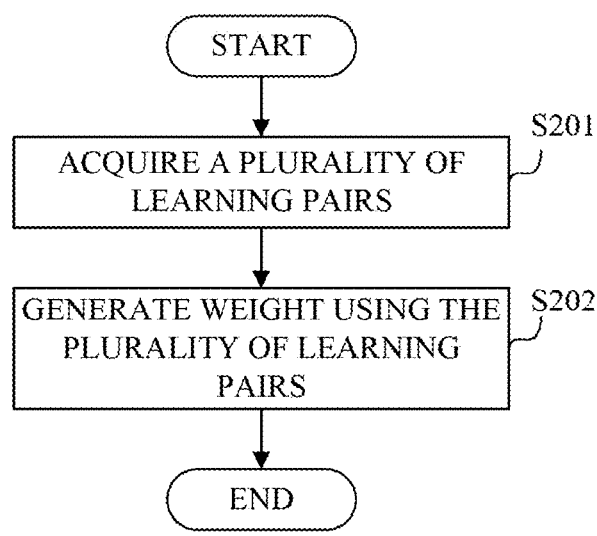
FIG. 8 is a flowchart relating to weight learning according to each embodiment.

Referring now to FIG. 8, a description will be given of learning of the weight information used in a multilayered neural network (CNN in this embodiment). FIG. 8 is a flowchart relating to the learning of the weight information. This embodiment performs prior learning in an image processing apparatus other than the imaging apparatus 100, and the result (plural pieces of weight information) is stored in the memory 103. However, the present invention is not limited to this embodiment, and the imaging apparatus 100 may include a learning unit.

First, in the step S201, the image processing apparatus acquires a plurality of learning pairs. The learning pair is the A+B image and the A image as input images into the CNN, and an image (ground truth image) to be obtained as an output image (blur reshaped image) from the CNN. The target to be corrected by the CNN changes according to the relationship between the learning pair of the input image and the ground truth image.

A description will be given of a method of generating the learning pair. First, an input image (A+B image and A image) and source data from which a ground truth image is generated are prepared. The source data is a three-dimensional model or a two-dimensional image, with a spectral intensity up to a wide range of a spatial frequency. The three-dimensional model can be generated by CG (computer graphics) or the like. The two-dimensional image may be either CG or a captured image. The A image and the B image can be generated by the simulation (imaging simulation) in which the image capturer 101 images source data. In the imaging simulation, the defocus blur generated in the image capturer 101 is added. The A+B image is obtained by adding the generated A image and B image to each other. The ground truth image is generated by applying a good defocus blur different from the optical system 101*a*. The examples of the good defocus blur include, for example, a flat circular blur illustrated in FIG. 7C and the Gaussian distribution function illustrated in FIG. 7D. Alternatively, the PSF obtained by weighted averaging of a plurality of Gaussian distribution functions having different variances may be used. When the source data includes a three-dimensional model, the defocus blur corresponding to the distance of each object is given from the in-focus distance.

When the source image includes a two-dimensional image, two-dimensional images are arranged at various defocus distances, the imaging simulation is performed, and a plurality of learning pairs corresponding to them are created. Nevertheless, in this case, a learning pair in which the two-dimensional image falls within the in-focus distance is also created. Reshaping the defocus blur may not change for the object at the in-focus distance. Unless the CNN learns that there is no change for the learning pair at the in-focus distance, the result output from the CNN for the in-focus object is unpredictable. It is thus necessary to create a learning pair in which the two-dimensional image falls within the in-focus distance. This embodiment reshapes the blur by dividing the A+B image and the A image into two in the vertical direction. Thus, the defocus blur given to the learning pair may be limited to one occurring only in one of the upper and lower areas in the image. In addition, the noise generated in the image sensor 101*b* may be added to the input image, and the ground truth image may be an image having no noises. By learning with this learning pair, the CNN will perform denoising simultaneously with blur shaping. The source data may have a luminance that exceeds a dynamic range of the image sensor 101*b*. This is because there is an actual object that does not fall within the luminance saturation value when imaging is performed by the imaging apparatus 101 under a specific exposure condition. The ground truth image is generated by applying a good defocus blur to the source data and by clipping the signal with the luminance saturation value of the image sensor 101*b*. The training image is generated by adding the defocus blur generated in the image capturer 101 and clipping the signal with the luminance saturation value.

Clipping the signal with the luminance saturation value has two major problems. The first problem is that the shape of defocus blur changes. For example, the shape of the defocus blur of the point light source should match the PSF at that defocus position, but may be a different shape by the clipping with the luminance saturation value. The second problem is the appearance of the false edge. Since the false edge has a high frequency, it is difficult to determine whether the object is in focus or defocused with saturation. However, the first problem is that, by using a learning pair generated from the source data exceeding the dynamic range of the image sensor 101b, the multilayer neural network learns also the change of the defocus blur caused by the clipping of the luminance saturation value. Furthermore, it is also easy to determine whether the false edge is the in-focus object or the defocus blur by inputting two images of different pupils into the neural network, and the second problem can also be solved.

Next, in the step S202 in FIG. 8, the image processing apparatus learns from a plurality of learning pairs, and generates weight information. In learning, it uses the same network structure as that used to generate the blur reshaped image in the step S102. This embodiment inputs the A+B image and the A image into the network structure illustrated in FIG. 1, and calculates an error between the output result (estimated blur reshaped image) and the ground truth image. In order to minimize this error, the filter (weight information) and the bias used for each layer are updated and optimized using an error backpropagation method (backpropagation) or the like. The initial values of the filter and the bias are arbitrary set, and can be determined, for example, from random numbers. Alternatively, pre-training such as Auto Encoder may be performed to previously learn the initial values for each layer.

A method for inputting all learning pairs into the network structure and for updating the learning information using all the information is called batch learning. This learning method suffers from an intensive computational load as the number of learning pairs increases. Conversely, a learning method that uses only one learning pair for updating the learning information and a different learning pair for each update is called online learning. This method has an advantage in that a calculation amount does not increase even if the number of learning pairs increases, but instead it is greatly affected by the noise present in one learning pair. Hence, the learning may use the mini-batch method located between these two methods. The mini-batch method extracts a small number of all learning pairs and updates learning information using them. The next update extracts and uses a small number of different learning pairs. By repeating this procedure, the disadvantages of batch learning and online learning can be reduced.

The image used to learn the weight information and to generate a blur reshaped image may be either a raw image or a developed image. When the A+B image and the A image are encoded, they are decoded and then used for the learning and the generation. If the gamma correction and the gamma value differ according to the image used for the learning and the input image used to generate the blur reshaped image, the input image may be processed to coincide with the learning image. The signal values of the A+B image and the A image (also ground truth image in the learning) may be normalized before they are input to the neural network. Without the normalization, if the number of bits is different between the learning and the blur reshaped image generation, the blur reshaped image cannot be correctly estimated. Since the scale changes according to the number of bits, the optimization during the learning may also affect the convergence. The normalization uses the maximum value (luminance saturation value) that the signal can actually take. For example, even when the A+B image is stored at 16 bits, the luminance saturation value may be 12 bits, etc. In this case, the signal range cannot become 0 to 1 without the normalization with the maximum value (4095) of 12 bits. Moreover, the value of the optical black may be subtracted in the normalization. Thereby, an actually available signal range for an image can be made closer to 0 to 1. More specifically, the normalization may be performed in accordance with the following expression (2).

$$S_{nor} = \frac{S - S_{OB}}{S_{satu} - S_{OB}} \quad (2)$$

In the expression (2), S represents a signal of the A+B image (or A image or ground truth image), $S_{OB}$ represents a signal value of the optical black (minimum signal value for the image), Ssatu represents a luminance saturation value of the signal, and Snor represents a normalized signal.

This embodiment can provide an image processing method, an image processing apparatus, an imaging apparatus, and a lens apparatus, each of which can reshape a defocus blur of an image and generate an image having a good defocus blur.

Second Embodiment

Next follows a description of an image processing system according to a second embodiment of the present invention. This embodiment individually provides an image processing apparatus that estimates a blur reshaped image, an imaging apparatus that acquires a captured image, and a learning server.

Figure 9:
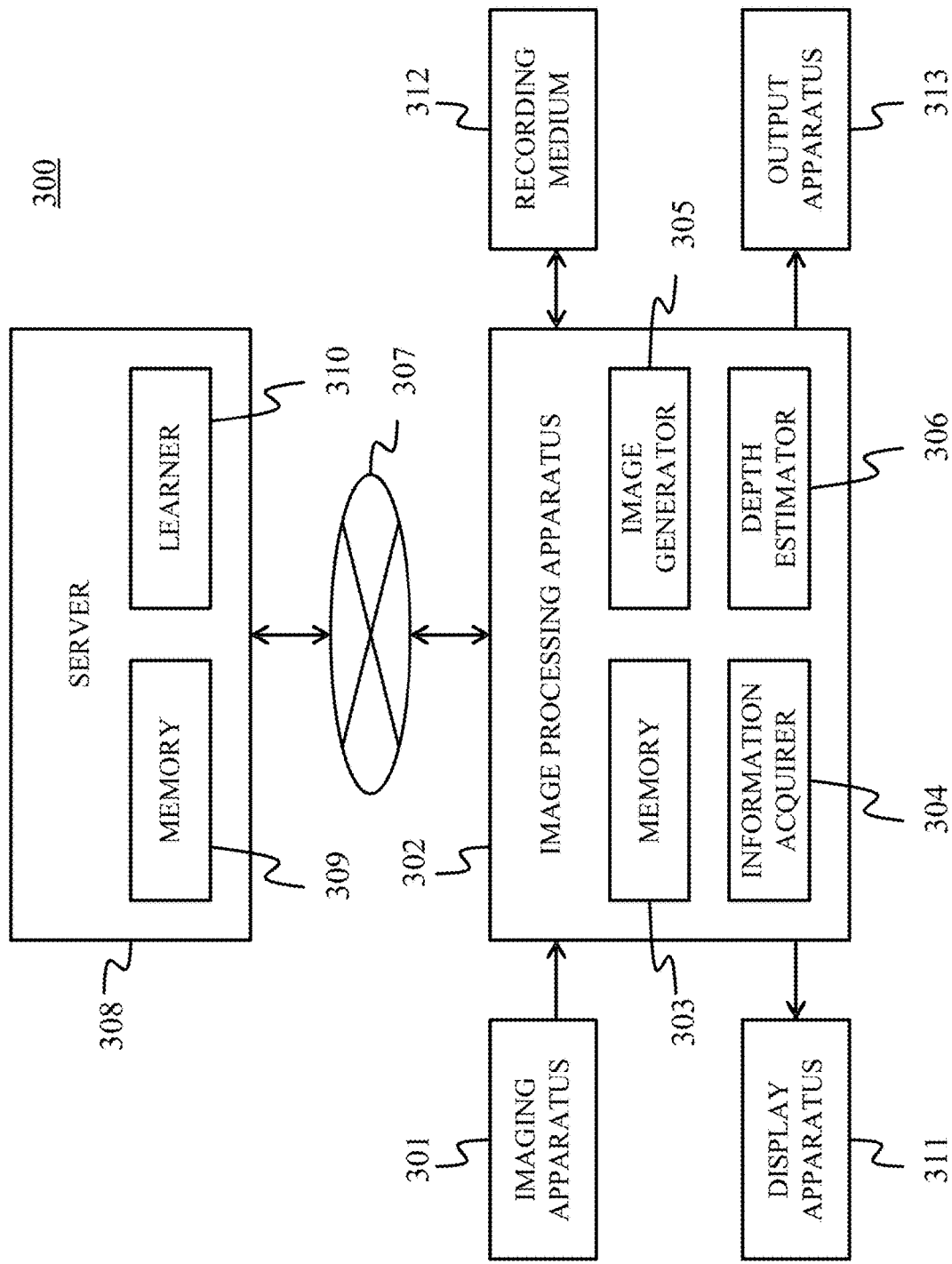
FIG. 9 is a block diagram of an image processing system according to a second embodiment.
Figure 10:
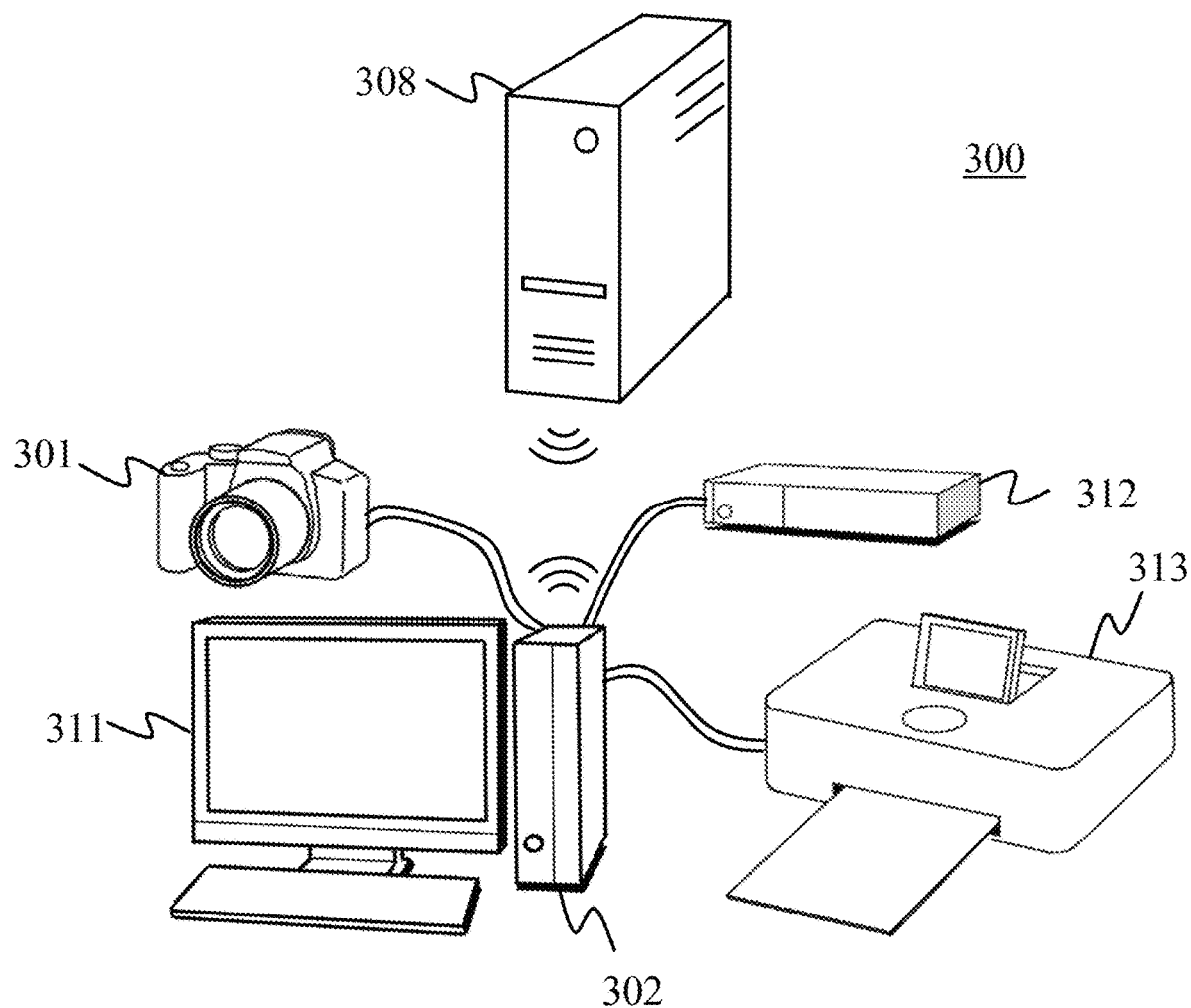
FIG. 10 is an overview of the image processing system according to the second embodiment.

Referring now to FIGS. 9 and 10, a description will be given of the image processing system according to this embodiment. FIG. 9 is a block diagram of an image processing system 300. FIG. 10 is an overview of the image processing system 300. As illustrated in FIGS. 9 and 10, the image processing system 300 includes an imaging apparatus 301, an image processing apparatus 302, a server 308, a display apparatus 311, a recording medium 312, and an output apparatus 313.

Figure 11:
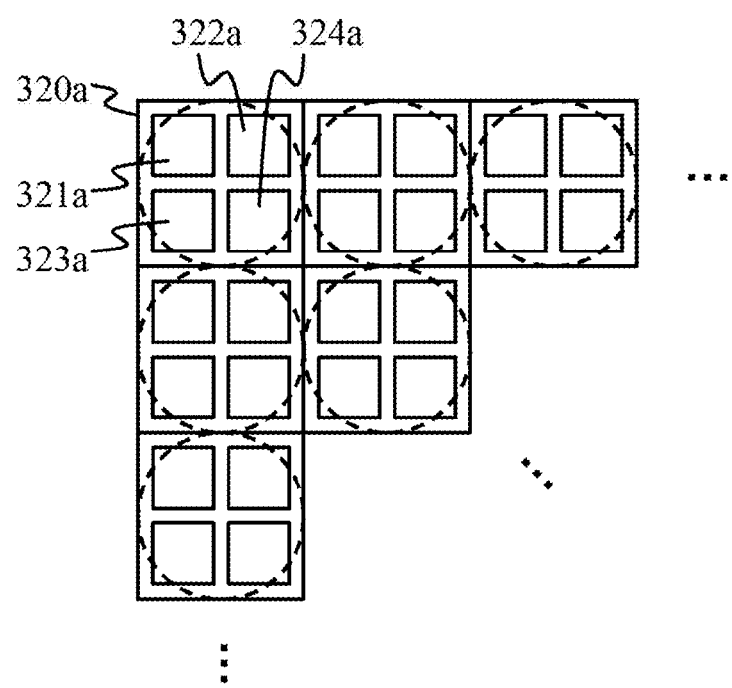
FIG. 11 is a block diagram of an image sensor according to the second embodiment.

A basic configuration of the imaging apparatus 301 is the same as that of the imaging apparatus 100 illustrated in FIG. 2 except an image processor that generates a blur reshaped image and an image capturer. In the imaging apparatus 301 according to this embodiment, a lens apparatus (optical system) is interchangeable. The image sensor of the image sensor 301 is configured as illustrated in FIG. 11. FIG. 11 is a structural view of an image sensor according to this embodiment. In FIG. 11, a broken line indicates a micro lens. Four photoelectric converters 321, 322, 323, and 324 ("b" and other subscripts are omitted) are provided in each of the pixels 320 ("b" and other subscripts are omitted), and the pupil in the optical system is divided into four or 2×2. The images acquired by the photoelectric converters 321 to 324 are sequentially referred to as an A image, a B image, a C image, and a D image, and the addition result among them is set to an ABCD image. Two images of the ABCD image (first image) and the A image (second image) are output from the image sensor as captured images.

When the imaging apparatus 301 and the image processing apparatus 302 are connected to each other, the ABCD image and the A image are stored in a memory 303. The image processing apparatus 302 causes an information acquirer 304, an image generator 305, and a depth estimator 306 to generate a blur reshaped image from the ABCD image and the A image. Then, the image processing apparatus 302 accesses the server 308 via a network 307 and reads the weight information used for the generation. The weight information is previously learned by a learner 310 and stored in a memory 309. The weight information is individually learned according to the lens type, the F-number, the reshaped defocus blur shape, and the like, and a plurality of pieces of weight information exists.

The image processing apparatus 302 acquires the weight information to be used in the memory 303 by the user's selection instruction or automatic selection determined from the input ABCD image, and generates a blur reshaped image. The blur reshaped image is output to at least one of the display apparatus 311, the recording medium 312, and the output apparatus 313. The display apparatus 311 includes, for example, a liquid crystal display or a projector. The user can work while confirming the image in the middle of processing via the display apparatus 311. The recording medium 312 includes, for example, a semiconductor memory, a hard disk drive, a server on a network, or the like. The output apparatus 313 includes a printer or the like. The image processing apparatus 302 serves to perform development processing and other image processing if necessary. This embodiment may store the weight information in a memory in the lens apparatus connected to the imaging apparatus 301, and may call it up in defocus blur reshaping.

Figure 12:
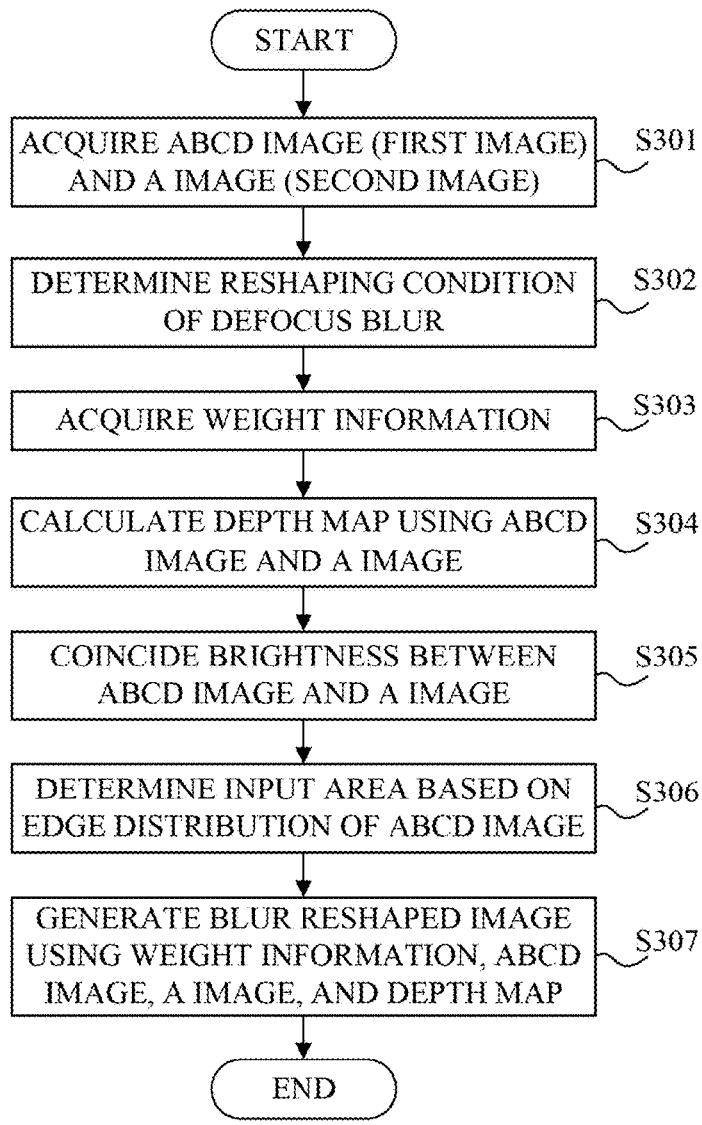
FIG. 12 is a flowchart illustrating generation processing of a blur reshaped image according to the second embodiment.

Referring now to FIG. 12, a description will be given of generation processing of a blur reshaped image performed by the image processing apparatus 302. FIG. 12 is a flowchart showing the generation processing of the blur reshaped image. Each step in FIG. 12 is mainly executed by the image processing apparatus 302 (information acquirer 304, image generator 305, depth estimator 306).

First, in the step S301, the information acquirer 304 acquires the ABCD image and the A image. In this embodiment, the first image is the ABCD image, and the second image is the A image. However, the first image does not have to be an image corresponding to the entire pupil in the optical system, and may be an image obtained by summing up at least two of the A image, the B image, the C image, and the D image.

Next, in the step S302, the information acquirer 304 determines a defocus blur reshaping condition. In determining the reshaping condition, it is necessary to select a factor which suppresses the influence by the blur reshaping among a plurality of factors (partially lost defocus blur, multiple blur, annular pattern, etc.) which change a defocus blur to an undesirable shape. Alternatively, the determination of the reshaping condition includes specifying a defocus blur reshape target (PSF with the flat intensity or Gaussian distribution function, etc.) to be changed by the blur reshaping. The reshaping condition may be manually determined by the user, or may be automatically determined from the image acquired in the step S301.

Figure 7C:
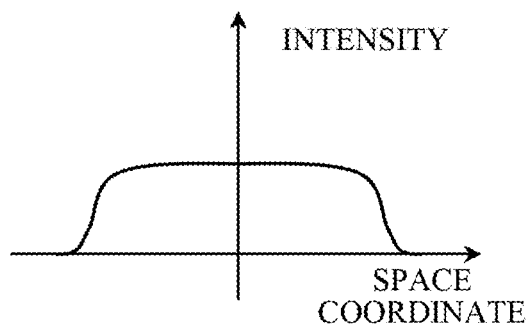
Figure 7D:
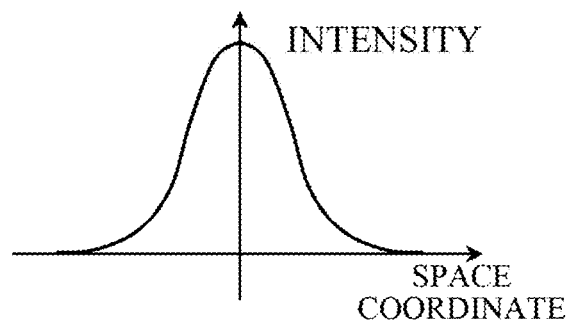

An illustrative automatic determination of the reshaping condition will be described. In the ABCD image (or the A image), the lens type used for imaging is stored as metadata. By specifying the lens type used for imaging, a magnitude of vignetting and the presence or absence of a doublet blur or an annular pattern can be recognized. Thus, based on the lens type used to capture the ABCD image, a factor (such as a partially lost defocus blur) can be determined which suppresses the influence by the blur reshaping. When a focal length for imaging is stored in the metadata, the reshaping condition can also be determined based on the information of the focal length. In a wide-angle lens, vignetting tends to be large. Thus, when the focal length is smaller than a certain threshold, the reshaping condition is determined so as to suppress the partial loss of defocus blur through blur reshaping. The target of the defocus blur shape may be determined based on, for example, the luminance value of the ABCD image as follows. Assume that the luminance saturated area of the ABCD image is a PSF having a flat intensity as illustrated in FIG. 7C, and the other area is a Gaussian distribution function as illustrated in FIG. 7D. Alternatively, the information of the imaging scene determined in the imaging may be read out of the metadata, and if the imaging scene is a night scene, the PSF may be flat in intensity, and in other cases, it may be a Gaussian distribution function.

Next, in the step S303, the information acquirer 304 acquires the weight information corresponding to the defocus blur reshaping condition determined in the step S302 among the plurality of weight information. A method of learning a plurality of weight information will be described later.

Next, in the step S304, the depth estimator 306 calculates a depth map from the ABCD image and the A image. The disparity between images or DFD (Depth From Defocus) based on a difference in the defocus blur size may be used to calculate the depth map. Instead of the depth map, a disparity map representing the disparity shift amount between the ABCD image and the A image may be calculated. The step S304 may be executed anytime between the steps S301 and S307.

Next, in the step S305, the image generator 305 coincides the brightness of the ABCD image with that of the A image. The A image is a dark image because its pupil is smaller than that of the ABCD image. Since the vignetting occurs at the image height other than the optical axis, the brightness ratio (light amount ratio) of the ABCD image to the A image changes depending on the image height and the azimuth. This will be described with reference to FIGS. 13A to 13C.

Figures 13A, 13B, 13C:
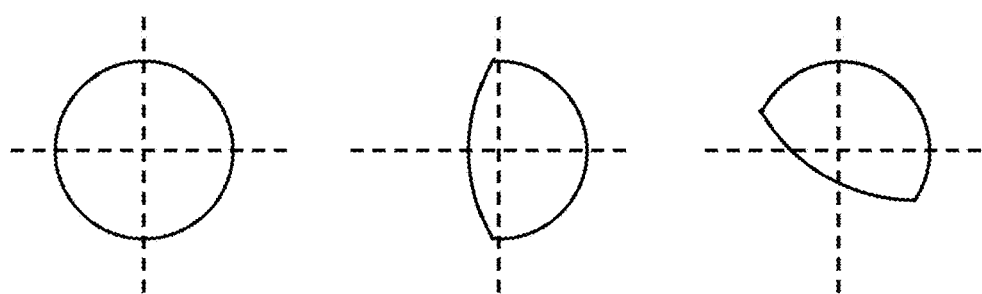
FIGS. 13A to 13C illustrate a relationship between divided pupils, image height, and vignetting according to the second embodiment.

FIGS. 13A to 13C illustrate a relationship between the divided pupil, the image height, and the vignetting. FIG. 13A illustrates the pupil on the optical axis of the optical system of the imaging apparatus 301. Broken lines in FIGS. 13A to 13C represents pupil dividing lines divided by four photoelectric converters. FIG. 13B illustrates the pupil at an image height different from that in FIG. 13A. In FIG. 13A, the light amounts of the four split pupils are uniform, but in FIG. 13B, the light amount ratio of them is biased due to the vignetting. FIG. 13C illustrates an azimuth different from that in FIG. 13B (an azimuth angle around the optical axis as the rotation axis on a plane perpendicular to the optical axis) at the same image height as that in FIG. 13B (at a position on a plane perpendicular to the optical axis and at the same distance from the optical axis). Even in this case, the light amount ratio of the partial pupil changes. Thus, when the ABCD image and the A image are input to the multilayer neural network, which will be described later, the brightness relationship between the two images varies due to the image height and the azimuth in the image, which may degrade the blur generation accuracy. This embodiment may preprocess to coincide the brightness of the ABCD image with that of the A image. This embodiment coincides the brightness of the A image with that of the ABCD image, but may coincide the brightness of the ABCD image with that of the A image. For each image height and azimuth, a first integral value and a second integral value obtained by integrating the transmittance distributions of the first pupil and the second pupil are acquired and used for the brightness adjustment. Each image height of the first image and the pixel of the azimuth are multiplied by the reciprocal of the corresponding first integral value, and for each image height of the second image and the pixel of the azimuth, the brightness may be coincided by multiplying the reciprocal of the value of the corresponding second integration.

A description will be given of two illustrative brightness coinciding methods between the two images. The first method is to coincide the brightness based on a light amount ratio (ratio of the transmittance distribution of the first pupil to the second pupil) between the first pupil (the entire pupil of the optical system) and the second pupil (partial pupil corresponding to the A image). The light amount ratio of the first pupil to the second pupil (ratio of the transmittance distribution of the first pupil to the transmittance distribution of the second pupil) for each image height of the A image and t the azimuth pixel is read out of the memory 303 to calculate a product, and to coincide the brightness with the ABCD image. The light amount ratio has a value of 1 or higher, which is different according to the image height and the azimuth.

The second method uses a local average pixel value between the ABCD image and the A image. Although the ABCD image and the A image have different aberrations, noises, and disparities, the ratio of the average pixel value in the partial area roughly corresponds to the light amount ratio described above since they image the same object. Thus, for example, a smoothing filter is applied to the ABCD image and the A image to obtain an average pixel value for each pixel. Then, a light amount ratio is obtained at this position from the ratio of average pixel values at pixels at the same position and the brightness can be coincided. However, when the average pixel value is obtained and the luminance saturated pixel is included, the value may shift from the light amount ratio. Thus, this embodiment may obtain an average pixel value except for the luminance saturated pixel. If the luminance saturation area is large and the average pixel value at that position cannot be obtained, the interpolation can be performed from the light amount ratio calculated at the periphery, and the light amount ratio corresponding to that position can be calculated. The partial area size may be determined based on the blur size and the base length (length between the positions of the centers of gravity) between the first pupil and the second pupil. The step S305 may be performed anytime between the steps S301 and S307.

Next, in the step S306 in FIG. 12, the image generator 305 determines input areas of the ABCD image and the A image to be input into the multilayer neural network. Although the entire image may be input to the neural network, a non-defocus area (in-focus area) may not be input because the defocus blur is reshaped in the step S307 described later. The calculation load can be lessened by setting only the area excluding the in-focus area in the image to the input area into the neural network. The edge distribution of the ABCD image (or the A image) is used to determine the in-focus area. The edge distribution is obtained, for example, by Wavelet-transforming the ABCD image. The edge (edge area) corresponds to an area in which the high frequency component has a certain intensity or higher. Since the edge exists in the in-focus area, an area not including the edge is set to the input area. Instead of the edge distribution, the input area may be determined based on the depth map (or disparity map) calculated in the step S304. Then, an area other than the area where the depth matches the in-focus distance in the metadata of the ABCD image is set to the input area. Since the imaging apparatus 301 is configured such that the disparity is zero at the in-focus distance, an area where the disparity is larger than the threshold is set to the input area in the disparity map. The step S306 may be performed anytime between the steps S301 and S307.

Next, in the step S307, the image generator 305 generates a blur reshaped image. At this time, the image generator 305 extracts input areas from the ABCD image and the A image, and inputs the extracted input areas to the multilayer neural network as input images. The image generator 305 also adds a depth map (or disparity map) corresponding to the input area as an input image.

Figure 14:
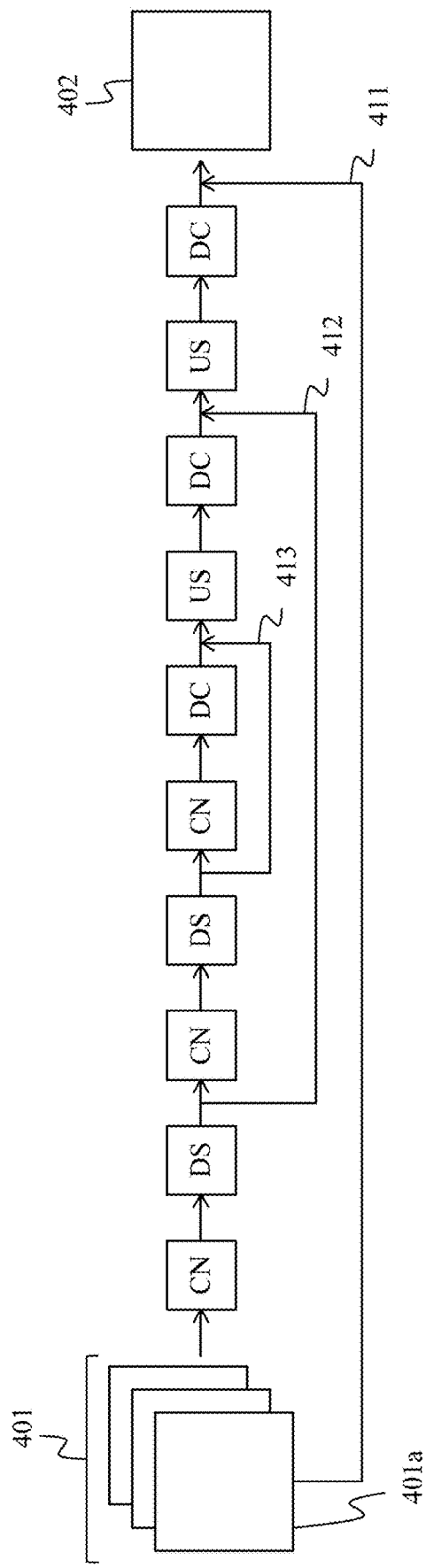
FIG. 14 illustrates a network structure that generates a blur reshaped image according to the second embodiment.

In this embodiment, the image generator 305 uses the network structure illustrated in FIG. 14. FIG. 14 illustrates a network structure for generating a blur reshaped image in this embodiment. In FIG. 14, the input image 401 may be the entire input area or part (divided area) of the input area obtained by dividing the input area. The input image 401 is an image in which an ABCD image, an A image, and the depth map (or disparity map) are connected (concatenated) in the channel direction. In FIG. 14, CN represents a convolution layer, DS represents a downsampling layer for downsampling the sampling rate of the input feature map, DC represents a deconvolution layer, and US represents an upsampling layer for upsampling the feature map. The downsampling rate of the downsampling layer and the upsampling rate of the upsampling layer are in an inverse relationship. The filters used for each convolution layer and deconvolution layer are determined based on the weight information.

Skip connections 412 and 413 combine feature maps output from non-consecutive layers. Each element of the feature map may be summed up or may be connected in the channel direction. The plurality of downsampling layers and the skip connections generate a plurality of feature maps of different resolutions (a plurality of feature maps in which downsampling is performed at different sampling rates). This makes it possible to calculate both the local feature and a wider feature without increasing the filter size of the convolution layer. A wider feature may be calculated because the defocus blur increases with the shift from the in-focus distance and the F-number. The skip connection also serves to improve the convergence in learning the filter. The skip connection 411 sums an ABCD image 401a of the input image 401 and the output of the multilayered neural network. Thereby, the blur reshaped image 402 is obtained. When the input area is divided to obtain the input image 401, the blur reshaped image 402 is calculated for the entire input area. A blur reshaped image for the entire image is generated by combining the blur reshaped image calculated by the neural network with the ABCD image other than the input area.

Figure 15:
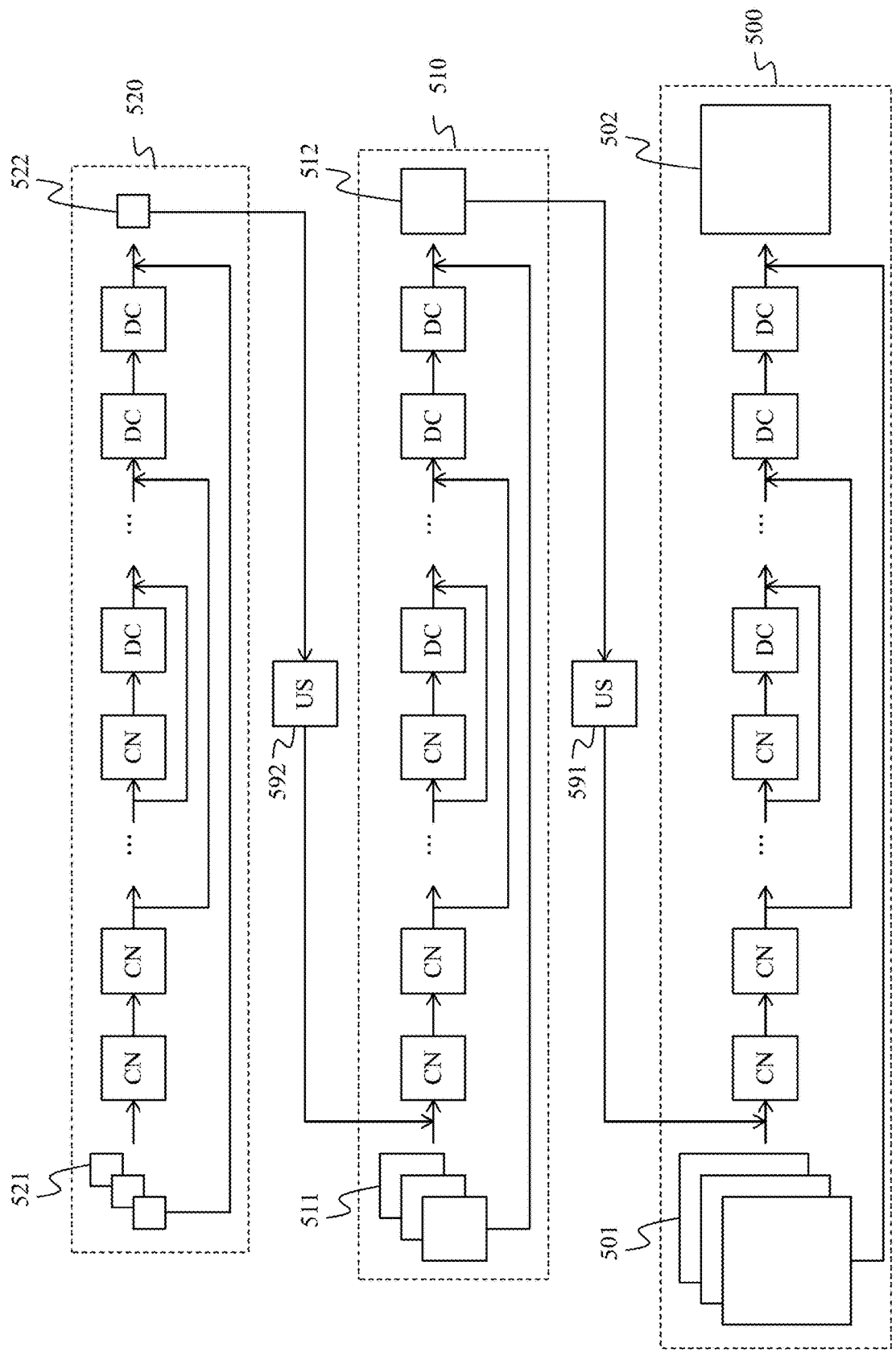
FIG. 15 illustrates another network structure that generates a blur reshaped image according to the second embodiment.

In this embodiment, the numbers of convolution layers, deconvolution layers, downsampling layers, upsampling layers, and skip connections are not limited to those illustrated in FIG. 14. The network structure is not limited to the structure illustrated in FIG. 14. For example, the network structure as illustrated in FIG. 15 may be used. FIG. 15 illustrates another network structure for generating a blur reshaped image in this embodiment.

The network structure in FIG. 15 is divided into a plurality of stages 500, 510, and 520, each of which has a different resolution. The stage 520 has a resolution that is $(1/m)^2$ times (m is a positive integer) as high as that of the ABCD image. The input image 521 includes the ABCD image, the A image, and the depth map whose resolution is downsampled by $(1/m)^2$ times. The skip connection is similar to that in FIG. 14. The blur reshaped image 522 with the resolution at the stage 520 is upsampled by m times by the upsampling layer 592 and input to the stage 510 which is 1/m times as high as the original resolution.

The input image 511 in the stage 510 is data in which the upsampling results of the ABCD image, the A image, the depth map, and the blur reshaped image 522 having a resolution of 1/m times are connected. Similarly, the blur reshaped image 512 of the stage 510 is upsampled by m times in the upsampling layer 591 and input to the stage 500.

The stage 500 has the same scale resolution as that of the original ABCD image. The input image 501 is data in which the upsampling results of the ABCD image, the A image, the depth map, and the blur reshaped image 512 are connected (concatenated). The blur reshaped image 502 calculated on the stage 500 is output as the final blur reshaped image. This embodiment does not limit the number of stages to three, or the network structure in the stages to the structure illustrated in FIG. 15. The weight of the filter in each stage may be made common (the same filter may be used regardless of the stage). Thereby, the data capacity of the weight information can be reduced.

The weight information learned by the learner 310 is performed according to the flowchart in FIG. 8 according to the first embodiment. Since the aberration (which affects the multiple blur), the vignetting, and the presence or absence of the aspheric lens differ according to the lens type in this embodiment, a learning pair is created for each lens type and reshaped defocus blur shape to be targeted and the weight information is learned. This embodiment provides an example of a single second image, but is applicable to a plurality of second images (such as three images of the A image, the C image, and the D image).

This embodiment can provide an image processing system capable of reshaping the defocus blur of an image and of generating an image having a good defocus blur.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

For example, the present invention can be implemented as an image processing system that includes a first processing apparatus (a user terminal such as an imaging apparatus, a smartphone, and a PC) that makes a request regarding image processing, and a second processing apparatus (server) that substantially performs the image processing of the present invention according to the request. For example, the information acquirer 304, the image generator 305, and the depth estimator 306 in the image processing system 300 according to the second embodiment may be provided on the server 308 side as the second processing apparatus, and the image processing apparatus 302 as the first processing apparatus may be configured to request the server 308 for the image processing using the first image and the second image. In this case, the first processing apparatus (user terminal) includes a transmitter that transmits a request the second processing apparatus (server) for the image processing, and the second processing apparatus (server) includes a receiver that receives the request transmitted from the first processing apparatus (user terminal).

Then, the first processing apparatus may transmit the first image and the second image to the second processing apparatus together with the image processing request. However, the second processing apparatus may obtain the first image and the second image stored at a location (external storage device) other than the first processing apparatus in response to the request of the first processing apparatus. After the second image processing apparatus performs the blur reshaping processing for the first image and the second image, the second processing apparatus may transmit the blur reshaped image to the first processing apparatus. The image processing system configured in this way enables the image processor to process with a relatively heavy processing load on the second processing apparatus side, and can reduce the burden of the user.

Each embodiment can provide an image processing method, an image processing apparatus, an imaging apparatus, a lens apparatus, a program, and a storage medium, each of which can reshape a defocus blur of an image and obtain an image with a good defocus blur.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2018-156813, filed on Aug. 24, 2018 and 2019-124790, filed on Jul. 3, 2019 which are hereby incorporated by reference herein in their entirety.

What is claimed is:

1. An image processing method comprising:
    acquiring a first image obtained by imaging an object space through a first pupil in an optical system, and a second image obtained by imaging the object space through a second pupil different from the first pupil in the optical system; and
    generating a blur reshaped image in which a blur caused by a defocus is reshaped, as an output of a neural network, by inputting the first image and the second image to the neural network.

2. The image processing method according to claim 1, wherein the blur reshaped image is an image in which an influence of at least one of vignetting, a multiple blur caused by a peak separation in a point spread function, an annular pattern, and shielding of a pupil in the optical system is reduced for the blur caused by the defocus.

3. The image processing method according to claim 1, wherein a spread of the blur caused by the defocus in the blur reshaped image is wider than that in the first image.

4. The image processing method according to claim 1, wherein a transmittance distribution of the first pupil is different from that of the second pupil.

5. The image processing method according to claim 1, wherein the second pupil is part of the first pupil.

6. The image processing method according to claim 1, wherein the first image and the second image are obtained by simultaneously imaging the object space through the optical system.

7. The image processing method according to claim 1, wherein the first image and the second image are captured by the same image sensor.

8. The image processing method according to claim 1, further comprising the step of coinciding a brightness between the first image and the second image,
wherein the step of generating the blur reshaped image is performed based on the first image and the second image after the step of coinciding the brightness.

9. The image processing method according to claim 8, wherein the step of coinciding the brightness is performed based on information on transmittance distributions of the first pupil and the second pupil.

10. The image processing method according to claim 8, wherein the step of coinciding the brightness is performed based on an average pixel value calculated for each partial area of the first image and the second image.

11. The image processing method according to claim 1, wherein the neural network is configured with information on a weight.

12. The image processing method according to claim 1, further comprising the step of dividing each of the first image and the second image by a straight line parallel to an axis that makes the second pupil line-symmetric and passes through a reference point of a corresponding one of the first image and the second image, and of performing reverse processing for the first image and the second image that have been divided,
wherein the step of generating the blur reshaped image is performed based on the first image and the second image after the reverse processing.

13. The image processing method according to claim 1, further comprising the step of calculating one of a disparity map and a depth map of the object space based on the first image and the second image,
wherein the step of generating the blur reshaped image is performed based on the one of the disparity map or the depth map.

14. The image processing method according to claim 13, wherein the step of generating the blur reshaped image includes the step of inputting the one of the disparity map and the depth map into the neural network.

15. The image processing method according to claim 14, wherein the step of generating the blur reshaped image includes the step of inputting into the neural network an input image configured by concatenating the first image, the second image, and the one of the disparity map and the depth map in a channel direction.

16. The image processing method according to claim 13, wherein the step of generating the blur reshaped image includes the step of determining an input area of each of the first image and the second image to be input to the neural network based on an edge distribution in the first image or the second image, or the one of the disparity map and the depth map calculated based on of the first image and the second image.

17. The image processing method according to claim 1, wherein the step of generating the blur reshaped image includes the steps of:
calculating a plurality of feature maps on which down-sampling at different sampling rates is performed with the neural network; and
generating the blur reshaped image based on the plurality of feature maps.

18. An image processing apparatus comprising:
an acquirer configured to acquire a first image obtained by imaging an object space through a first pupil in an optical system, and a second image obtained by imaging the object space through a second pupil different from the first pupil in the optical system; and
a generator configured to generate a blur reshaped image in which a blur caused by a defocus is reshaped, as an output of a neural network, by inputting the first image and the second image to the neural network.

19. An imaging apparatus comprising:
an image sensor configured to photoelectrically convert an optical image formed by an optical system; and
an image processing apparatus,
wherein the image processing apparatus includes:
an acquirer configured to acquire a first image obtained by imaging an object space through a first pupil in an optical system, and a second image obtained by imaging the object space through a second pupil different from the first pupil in the optical system; and
a generator configured to generate a blur reshaped image in which a blur caused by a defocus is reshaped, as an output of a neural network, by inputting the first image and the second image to the neural network.

20. The imaging apparatus according to claim 19, wherein the image sensor includes a plurality of pixels,
wherein each of the plurality of pixels has a plurality of photoelectric converters,
wherein the pixels receive light at the plurality of photoelectric converters at different incidence angles and generate a plurality of signals, and
wherein the image sensor outputs the first image corresponding to an addition signal obtained by adding the plurality of signals, and the second image corresponding to one of the plurality of signals or an addition signal obtained by adding part of the plurality of signals.

21. A lens apparatus detachable from an imaging apparatus comprising:
an optical system; and
a memory configured to store information on a weight input to a neural network,
wherein the imaging apparatus includes:
an acquirer configured to acquire a first image obtained by imaging an object space through a first pupil in an optical system, and a second image obtained by imaging the object space through a second pupil different from the first pupil in the optical system; and
a generator configured to generate a blur reshaped image in which a blur caused by a defocus is reshaped, as an output of the neural network, by inputting the first image and the second image to the neural network.

22. A non-transitory computer-readable storage medium storing a program for causing a computer to execute an image processing method,
wherein the image processing method includes:
acquiring a first image obtained by imaging an object space through a first pupil in an optical system, and a second image obtained by imaging the object space through a second pupil different from the first pupil in the optical system; and
generating a blur reshaped image in which a blur caused by a defocus is reshaped, as an output of a neural network, by inputting the first image and the second image to the neural network.

23. An image processing system comprising a first processing unit and a second processing unit,
wherein the first processing apparatus includes a transmitter configured to transmit a request to the second processing apparatus for image processing using a first image obtained by imaging an object space through a first pupil in the optical system, and a second image obtained by imaging the object space through a second pupil different from the first pupil in the optical system, and
wherein the second processing apparatus includes:
a receiver configured to receive the request sent from the first processing apparatus;
an acquirer configured to acquire the first image and the second image; and
a generator configured to generate a blur reshaped image in which a blur caused by a defocus is reshaped, as an output of a neural network, by inputting the first image and the second image to the neural network.

\* \* \* \* \*